US011456622B2

(12) United States Patent
Gong et al.

(10) Patent No.: US 11,456,622 B2
(45) Date of Patent: Sep. 27, 2022

(54) CHARGING DEVICE WITH AN ENGINE STARTING INTERFACE, CHARGING DEVICE WITH A CHARGING INPUT INTERFACE AND CHARGING METHOD

(71) Applicant: NEW FOCUS LIGHTING & POWER TECHNOLOGY (SHANGHAI) CO., LTD., Shanghai (CN)

(72) Inventors: Shiquan Gong, Shanghai (CN); Jianxing Zhang, Shanghai (CN)

(*) Notice: Subject to any disclaimer, the term of this patent is extended or adjusted under 35 U.S.C. 154(b) by 224 days.

(21) Appl. No.: 16/963,773

(22) PCT Filed: Mar. 6, 2018

(86) PCT No.: PCT/CN2018/078167
§ 371 (c)(1),
(2) Date: Jul. 21, 2020

(87) PCT Pub. No.: WO2019/148578
PCT Pub. Date: Aug. 8, 2019

(65) Prior Publication Data
US 2021/0044133 A1 Feb. 11, 2021

(30) Foreign Application Priority Data
Jan. 31, 2018 (CN) .......................... 201810099590.6

(51) Int. Cl.
*H01M 10/44* (2006.01)
*H01M 10/46* (2006.01)
(Continued)

(52) U.S. Cl.
CPC .............. *H02J 50/10* (2016.02); *H02J 1/122* (2020.01); *H02J 7/0045* (2013.01); *H02J 7/04* (2013.01);
(Continued)

(58) Field of Classification Search
CPC .... H02J 7/04; H02J 7/00712; H02J 7/007192; H02J 7/0047; H02J 7/0042; H02J 7/0045; H02J 50/10; H02J 50/005; F02N 11/12
(Continued)

(56) References Cited

FOREIGN PATENT DOCUMENTS

| CN | 103138342 B | * | 12/2014 | ............ H02J 7/0021 |
| CN | 107579583 A | * | 1/2018 | .............. H02J 7/007 |

OTHER PUBLICATIONS

Translation of CN103138342B (Dec. 2014). (Year: 2014).*
Translation of CN107579583A (Jan. 2018). (Year: 2018).*

* cited by examiner

*Primary Examiner* — Edward Tso
(74) *Attorney, Agent, or Firm* — Clement Cheng

(57) ABSTRACT

Provided are a charging device and a charging method. The charging device comprises: a charging device body and an engine starting interface provided on the charging device body, wherein the charging device body comprises: a power supply, a control unit, and at least one electromagnetic coil. The control unit is respectively connected to the power supply and the at least one electromagnetic coil, and the control unit is configured to control the at least one electromagnetic coil to generate a varying magnetic field when the amount of power of the power supply is greater than or equal to a pre-set amount of power and the charging device is wirelessly connected to a device to be charged, so that an internal coil of the device to be charged generates a varying current to cause the charging device to wirelessly charge the device to be charged.

19 Claims, 4 Drawing Sheets

(51) Int. Cl.
*H02J 50/10* (2016.01)
*H02J 50/00* (2016.01)
*H02J 7/00* (2006.01)
*H02J 7/04* (2006.01)
*H02J 50/80* (2016.01)
*H02J 1/10* (2006.01)

(52) U.S. Cl.
CPC ............ *H02J 50/005* (2020.01); *H02J 50/80* (2016.02); *H02J 7/00712* (2020.01); *H02J 7/007192* (2020.01); *H02J 2310/46* (2020.01)

(58) Field of Classification Search
USPC ....... 320/107, 108, 114, 115, 132, 149, 150, 320/DIG. 21
See application file for complete search history.

CHARGING DEVICE WITH AN ENGINE STARTING INTERFACE, CHARGING DEVICE WITH A CHARGING INPUT INTERFACE AND CHARGING METHOD

CROSS-REFERENCE TO RELATED APPLICATIONS

The present application claims priority to and the benefit of Chinese Patent Application No. CN 201810099590.6 titled "charging equipment" filed on Jan. 31, 2018, the entire content of which is incorporated herein by reference.

BACKGROUND OF THE INVENTION

1. Field of the Invention

The invention relates to the technical field of starting of a power supply, and more particularly, to a charging device with an engine starting interface, charging device with a charging input interface and a charging method.

2. Description of the Related Art

With the development of society and economy, the car has become a necessity. An increase in the number of registered cars in the world leads to an increase in the number of second-hand cars. In addition, cars may not start because of an increase service life and an old battery, therefore, a power supply for starting the car will be more widely used.

Typically, the power supply for starting the car uses lead-acid battery. Such a lead-acid battery has some disadvantages: it is relatively bulky and inconvenient to carry; when it is not charged for some time, the phenomenon of undervoltage may occur since its self discharging capability is relatively strong. In this case, the battery may not start, and the batter may even be permanently damaged since its power-lack.

The starting power supply of lithium battery is easy to use and has a small leakage current, which solves the problems of large leakage current and heavy weight in the prior art. In addition, the USB function enables the power supply to be used by different mobile devices. However, users rarely use the starting power supply of lithium battery to start the cars, so it is a huge waste of resources. In addition, although the USB function is incorporated into the starting power supply, it is often the case that people will forget to bring the USB cable for charging, bring a lot of inconvenience to the users.

SUMMARY OF THE INVENTION

In order to improve the foregoing problems existing in the prior art, an object of the present invention is to provide a charging device with an engine starting interface, charging device with a charging input interface and a charging method.

For this purpose, the technical solution is as follows:

a charging device is provided in an embodiment of the present invention, comprising: a charging device body and an engine starting interface provided on the charging device body, wherein the charging device body comprises: a power supply, a control unit, and at least one electromagnetic coil; the control unit is respectively connected to the power supply and the at least one electromagnetic coil; and the control unit is configured to control the at least one electromagnetic coil to generate a varying magnetic field when the amount of power of the power supply is greater than or equal to a pre-set amount of power and the charging device is wirelessly connected to a device to be charged, so that an internal coil of the device to be charged generates a varying current to cause the charging device to wirelessly charge the device to be charged.

Optionally, the charging device further comprises: a charging input interface provided on the charging device body for charging the power supply via the charging input interface; and at least one USB charging output interface, provided on the charging device body, and configured for wired charging.

Optionally, the USB charging output interface and the charging input interface are provided on the same side of the power supply, and are arranged side by side.

Optionally, the charging device body further comprises: a switching circuit, the switching circuit is connected to the control unit.

Optionally, the control unit comprises: a control circuit and a voltage sampling circuit connected to the control circuit, wherein the voltage sampling circuit is connected to the power supply and is configured to acquire an instant voltage amplitude of the power supply, the control circuit controls the power supply to be in a low power consumption state when the instant voltage amplitude is less than a pre-set voltage amplitude.

Optionally, the voltage sampling circuit is configured to acquire the instant voltage amplitude of the power supply in real time when the switching circuit is in a closed state.

Optionally, the control unit further comprises: a temperature sampling circuit connected to the control circuit, the temperature sampling circuit is connected to the power supply and is configured to acquire an instant temperature value of the power supply, and the control circuit controls the power supply to be in a low power consumption state when the instant temperature value is greater than a pre-set temperature value.

Optionally, the temperature sampling circuit is configured to sample the instant temperature value of the power supply in real time when the switching circuit is in a closed state.

Optionally, the control unit further comprises: a current sampling circuit connected to the control circuit, the current sampling circuit is configured to acquire an instant charging current value of the device to be charged, and the control circuit controls the power supply to be in a low power consumption state when the instant charging current value is less than a pre-set current value.

Optionally, the current sampling circuit is configured to acquire the instant charging current value of the charging device in real time when the switching circuit is in a closed state.

Optionally, the charging device further comprises: a display screen provided on the charging device body and connected to the control unit.

Optionally, the display screen is provided on one side of the power supply, and the display screen, the charging input interface, the USB charging output interface are arranged side by side.

Optionally, the charging device further comprises: an illumination lamp provided on the charging device body and connected to the power supply.

Optionally, the charging device further comprises: a housing provided around the charging device body.

Optionally, the housing comprises: a first housing, a second housing, and a third housing, the first housing is disposed opposite to the second housing, the first housing is connected to the second housing, the first housing and the second housing form a cavity to enable the charging device body to be provided inside the cavity.

Optionally, a side wall of the first housing is formed with a first opening, a side wall of the second housing is formed with a third opening, the third opening is disposed opposite to the first opening, the first and third opening form a first installation cavity, and the third housing is accommodated and installed inside the first installation cavity.

Optionally, a side wall of the first housing is formed with a second opening, a side wall of the second housing is formed with a fourth opening, the fourth opening is disposed opposite to the second opening, the fourth and second opening form a second installation cavity, and the second installation cavity is configured for accommodation and installation of a first illumination lamp.

Optionally, the charging device further comprises: an anti-skid mat provided on the housing.

A charging device is also provided in the embodiment of the present invention, comprising: a charging device body and a charging input interface provided on the charging device body, wherein the charging device body comprises: a power supply, a control unit, and at least one electromagnetic coil, the control unit is respectively connected to the power supply and the at least one electromagnetic coil; the charging input interface is connected to the power supply for charging the power supply;

and the control unit is configured to control the at least one electromagnetic coil to generate a varying magnetic field when the charging device is spaced apart from a device to be charged, so that an internal coil of the device to be charged generates a varying current to cause the charging device to wirelessly charge the device to be charged.

A charging method is also provided in the embodiment of the present invention, comprising:

wirelessly connecting a charging device and a device to be charged;

detecting whether the amount of power of the power supply of the charging device is greater than or equal to a pre-set amount of power;

controlling at least one electromagnetic coil to generate a varying magnetic field when the amount of power of the power supply of the charging device is greater than or equal to the pre-set amount of power, so that an internal coil of the device to be charged generates a varying current to cause the charging device to wirelessly charge the device to be charged.

By adopting the above-mentioned technical solutions, the present invention has the beneficial effects that a charging device is provided, comprising: a charging device body and an engine starting interface provided on the charging device body, wherein the charging device body comprises: a power supply, a control unit, and at least one electromagnetic coil. The control unit is respectively connected to the power supply and the at least one electromagnetic coil, and the control unit is configured to control the at least one electromagnetic coil to generate a varying magnetic field when the amount of power of the power supply is greater than or equal to a pre-set amount of power and the charging device is wirelessly connected to a device to be charged, so that an internal coil of the device to be charged generates a varying current to cause the charging device to wirelessly charge the device to be charged. The present application can not only be used for starting a vehicle, but can also be used for wirelessly charging a device to be charged.

Additional features and advantages of the present application will be set forth in the description which follows, and in part will be obvious from the description, or may be learned by practice of the present application. The objects and other advantages of the application may be realized and obtained by means of the structures particularly pointed out in the description, the claims and the drawings.

BRIEF DESCRIPTION OF THE DRAWINGS

In order to better illustrate embodiments of the present invention and the technical solution in the prior art, the accompanying drawings to be used in the embodiments will be briefly set forth. It is obvious that the drawings described hereinafter are only some of the embodiments of the present invention, and additional drawings will be readily occur to those skilled in the art based on those drawings. The above and other objects, features, and advantages of the present invention will become apparent from the drawings. Like reference numerals refer to like elements throughout. In the drawings, the size of some of the elements are not drawn to scale, and the dimensions and the relative dimensions do not correspond to actual reductions to practice of the invention. The accompanying drawings mainly serve to explain the principles of the invention.

Figure 1:
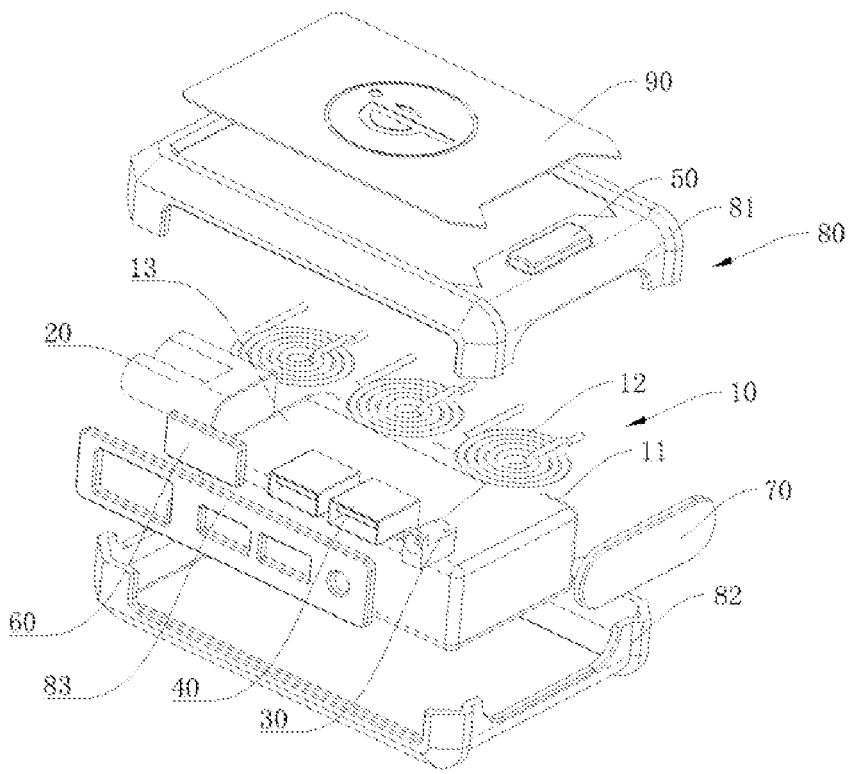
FIG. 1 shows an explosive view of a charging device according to an embodiment of the present invention.

Reference numerals: 10 charging device body; 11 power supply; 12 electromagnetic coil; 13 control unit; 131 control circuit; 132 voltage sampling circuit; 133 temperature sampling circuit; 134 current sampling circuit; 20 engine stating interface; 30 charging input interface; 40 USB charging output interface; 50 switching circuit; 60 display screen; 70 illumination lamp; 80 housing; 81 first housing; 82 second housing; 83 third housing; 90 anti-skid mat.

DETAILED DESCRIPTION

In order to make the objects, technical solution and advantages of the embodiments become more apparent, the technical solution in the embodiment of the present invention will now be described more fully hereinafter with reference to the accompanying drawings. However, it is obvious that the embodiments described herein are only parts of the embodiments instead of all the embodiments. Generally, components shown in the embodiments and described, and illustrated in the drawings may be arranged and designed in many different configurations.

Therefore, the detailed description of the embodiments of the present invention is intended to illustrate the selected embodiment of the invention rather than to define to scope of the invention. It is apparent to those skilled in the art that other embodiments obtained from the embodiments presented herein are all construed to fall into the scope of the invention.

It should be noted that similar reference numerals and letters denote similar items. Therefore, once one item is defined in one drawing, further explanation of the item will not be necessarily needed in the subsequent drawings.

As used herein, the terms "first", "second", "third" and the like in the description are used for distinguishing between similar elements and not necessarily for suggesting or implying relative importance. As used herein, and unless the context otherwise stated, the terms "connected to", "coupled to" are intended to include directly connected to, or removably connected to, or integrally connected to; or it may be intended to include mechanical connection, or electrical connection; or direct connection, or indirect connection achieved through a medium, or internal communication between two elements. For those skilled in the art, the above-mentioned terms can be known in the present invention depending on different situations.

Examples

Referring to FIG. 1, an explosive view of a charging device according to an embodiment of the present invention is shown. The charging device provided by the embodiments of the present application can be used for staring the engine of the vehicle, not only for cars, motorcycles, but also for other vehicles, and the charging device can also be used for providing working voltage for the start of the engine of a vehicle to be started. The charging device can also be used as a power bank for charging a device to be charged when not used for starting the engine of the vehicle. For example, the charging device can be used for charging electronic devices, including smart phones, and tablets, etc.

The charging device may comprise: a charging device body 10 and an engine starting interface 20 provided on the charging device body 10, wherein the charging device body 10 comprises: a power supply 11, a control unit 13, and at least one electromagnetic coil 12. The control unit 13 is respectively connected to the power supply 11 and the at least one electromagnetic coil 12. The power supply 11 provides voltage required by the charging device. The charging device may connect the engine starting interface 20 and an interface for a vehicle to be started though a smart start clip, so that the power supply 11 in the charging device can provide working voltage for starting the engine of the vehicle to be started. In this embodiment, the power supply 11 may be a lithium battery. In other embodiments, the power supply 11 may also be a lead-acid battery or other power supplies. Wherein, the lithium battery refers to a secondary battery (i.e., a rechargeable battery). When the lithium battery is in use, the lithium ions move from the cathode to the anode or vice versa. When the battery is charging or discharging, the lithium ions embed and de-embed between the cathode and the anode: when the battery is charging, the lithium ions de-embed from the anode, and embed into the cathode by electrolyte, and the cathode is rich in lithium; when it is discharging, the opposite is true. In this embodiment, the power supply 11 is substantially a rectangular structure. The engine stating interface 20 is provided at one end of the power supply 11.

The number of the at least one electromagnetic coil 12 may be 1, 2, 3, or 4, and in this embodiment, the number of the at least one electromagnetic coil 12 is 4. In this embodiment, the electromagnetic coil 12 may be a high-frequency switching coil. In this embodiment, the electromagnetic coil 12 is a disc-shaped coil in a spiral setting, and two ends of the coil extend in the same direction. The four electromagnetic coils 12 are provided on the same side of the power supply 11. The four electromagnetic coils 12 are arranged and spaced apart from each other along the direction of length of the power supply 11.

The control unit 13 is configured to control the at least one electromagnetic coil 12 to generate a varying magnetic field when the amount of power of the power supply 11 is greater than or equal to a pre-set amount of power and the charging device is wirelessly connected to a device to be charged, so that an internal coil of the device to be charged generates a varying current. In this embodiment, the device to be charged may be a smart phone. Furthermore, the internal coil of the device to be charged generates a varying current in the varying magnetic field to cause the charging device to wirelessly charge the device to be charged. Similarly, the control unit 13 may not control the at least one electromagnetic coil 12 to generate a varying magnetic field when the amount of power of the power supply 11 is less than the pre-set amount of power, therefore, the charging device will not wirelessly charge the device to be charged. When the control unit 13 detects that no device to be charged is wirelessly connected to the charging device, the at least one electromagnetic coil 12 will not generate a varying magnetic field, and the power supply 11 then is in a low power consumption state.

In the embodiment of the present application, the control unit 13 may also be configured to control the at least one electromagnetic coil to generate a varying magnetic field when the amount of power of the power supply 11 is greater than or equal to a pre-set amount of power and the charging device is spaced apart from a device to be charged, so that an internal coil of the device to be charged generates a varying current to cause the charging device to wirelessly charge the device to be charged.

As an embodiment, the charging device further comprises: a charging input interface 30 provided on the charging device body 10, wherein the charging input interface 30 may be connected to the power supply 11 for charging the power supply 11 via the charging input interface 30. Furthermore, the charging input interface 30 is connected to an external power supply via a power cord to cause the external power supply to charge the power supply 11 in the charging device. In this embodiment, the charging input interface 30 is arranged on one side of the power supply 11.

The charging device further comprises: at least one USB charging output interface 40, provided on the charging device body 10, and configured for wired charging. The at least one USB charging output interface 40 is connected to a device to be charged through a data line to cause the power supply 11 in the charging device to charge at least one type of device to be charged in a wired manner. The charging device charges different devices to be charged via different USB interfaces. In this embodiment, the number of the at least one USB charging output interface 40 is two, and the two USB charging output interfaces 40 are arranged side by side on one side of the power supply 11. In addition, the two USB charging output interfaces 40 and the charging input interface 30 are provided on the same side of the power supply, and are arranged side by side.

As an embodiment, the charging device body 10 further comprises: a switching circuit 50. The switching circuit 50 is connected to the control unit 13. The control unit 13 starts to work when an internal switch of the switching circuit 50 is in a closed state. The control unit 13 starts to detect the amount of power of the power supply 11 and an external device. The control unit 13 is configured to control the at least one electromagnetic coil 12 to generate a varying magnetic field when the amount of power of the power supply 11 is greater than or equal to a pre-set amount of power and the charging device is wirelessly connected to a device to be charged, so that an internal coil of the device to be charged generates a varying current to cause the charging device to wirelessly charge the device to be charged. Similarly, the power supply 11 provides the voltage required by the start of the engine of the vehicle when the amount of power of the power supply 11 is greater than or equal to a pre-set amount of power and the charging device is connected to the vehicle engine device in a wired manner.

Figure 2:
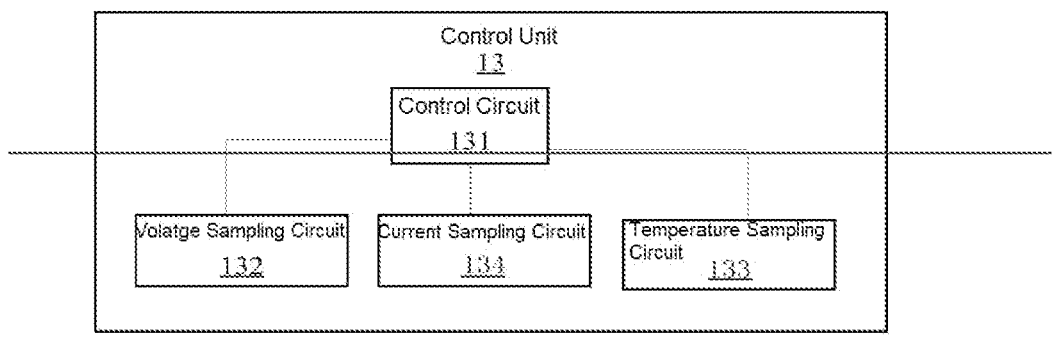
FIG. 2 shows a block diagram of a control unit according to an embodiment of the present invention.

Referring to FIG. 2, a block diagram of a control unit according to an embodiment of the present invention is shown. The control unit 13 comprises: a control circuit 131 and a voltage sampling circuit 132 connected to the control circuit 131, wherein the voltage sampling circuit 132 is connected to the power supply 11 and configured to acquire an instant voltage amplitude of the power supply 11. When the switching circuit 50 is in a closed state, the power supply 11 provides the voltage required by the operating of the voltage sampling circuit 132, and the voltage sampling circuit 132 acquires an instant voltage amplitude of the power supply 11. The control circuit 131 controls the power supply 11 to be in a low power consumption state when the instant voltage amplitude is less than a pre-set voltage amplitude.

Furthermore, the control unit 13 further comprises: a temperature sampling circuit 133 connected to the control circuit 131. The temperature sampling circuit 133 is connected to the power supply 11 and configured to acquire an instant temperature value of the power supply 11. When the switching circuit 50 is in a closed state, the power supply 11 provides the voltage required by the operating of the temperature sampling circuit 133, and the temperature sampling circuit 133 starts to sample an instant temperature value of the power supply 11. The control circuit 131 controls the power supply 11 to be in a low power consumption state when the instant temperature value is greater than a pre-set temperature value, so as to avoid damaging the internal circuit of the power supply 11 due to the excessive high temperature of the power supply 11. Therefore, the temperature sampling circuit 133 can keep the power supply 11 within a reasonable temperature range, so as to increase the service life of the power supply 11.

As an embodiment, the control circuit 131 controls the power supply 11 to be in a low power consumption state when the instant temperature value of the power supply 11 is less than a first pre-set temperature value, so as to avoid short circuits in the power supply 11 due to an extremely low temperature of the power supply 11.

Furthermore, the control unit 13 further comprises: a current sampling circuit 134 connected to the control circuit 131. The current sampling circuit 134 is configured to acquire an instant charging current value of the device to be charged. When the switching circuit 50 is in a closed state, the power supply 11 provides the voltage required by the operating of the current sampling circuit 134, and the current sampling circuit 134 starts to acquire an instant charging current value of the power supply in real time. The control circuit 131 controls the power supply 11 to be in a low power consumption state when the instant charging current value is less than a pre-set current value, that is, the charging device is not connected to any devices to be charged, so as to avoid wasting the amount of power of the charging device, and saving the amount of power of the power supply 11 in the charging device.

As an embodiment, the charging device further comprises: a display screen 60 provided on the charging device body 10 and connected to the control unit 13. In this embodiment, the display screen 60 may be a liquid crystal display, or a nixie tube. In other embodiments, the display screen 60 may also be any devices for display. In this embodiment, the display screen 60 is arranged on one side of the power supply 11, and arranged side by side with the charging input interface 30 and the USB charging output interface 40. The display screen 60 is configured to display the instant voltage amplitude, the instant temperature value, and/or the instant charging current value, that is, the display screen 60 is configured to display at least one of the instant voltage amplitude, the instant temperature value, and the instant charging current value. Furthermore, in this embodiment, when the switching circuit 50 is in a closed state, the power supply 11 provides the voltage required by the operating of the display screen 60, and the display screen 60 displays the instant voltage value of the power supply 11 in real time acquired by the voltage sampling circuit 132 in the control unit 13, the temperature sampling circuit 133 acquires an instant temperature value of the power supply 11 in real time and/or the current sampling circuit 134 acquires an instant charging current value of the charging device in real time, and informs the user of the instant state of charging device. As an embodiment, the display screen 60 can also display the charging status of the charging device, and can also display the error of the status of the charging device.

Figure 3:
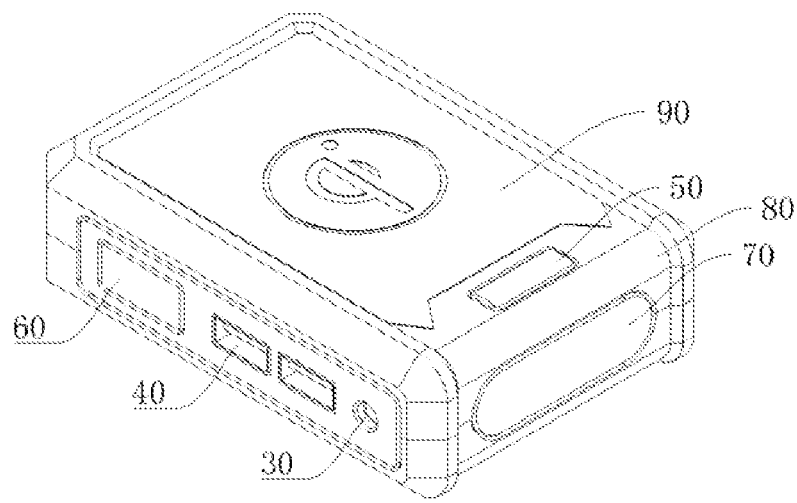
FIG. 3 shows a schematic diagram of a charging device according to an embodiment of the present invention from a first perspective.
Figure 4:
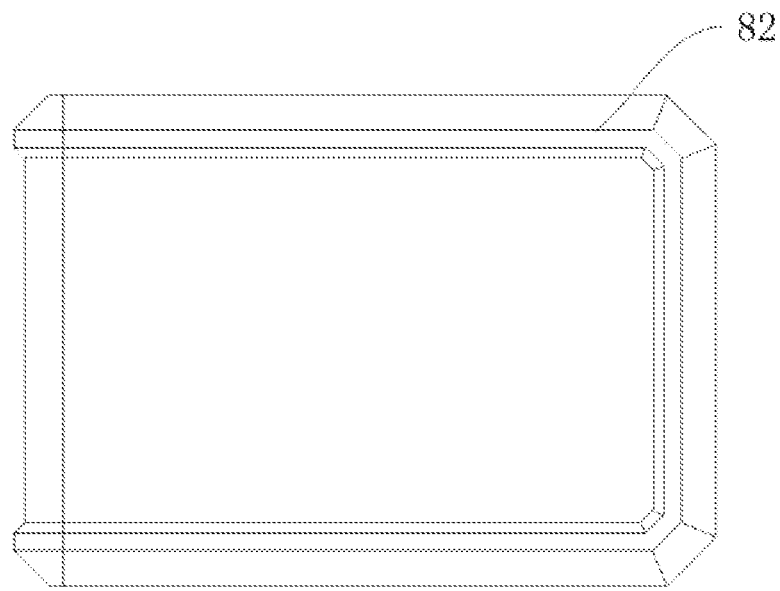
FIG. 4 shows a schematic diagram of a charging device according to an embodiment of the present invention from a second perspective.
Figure 5:
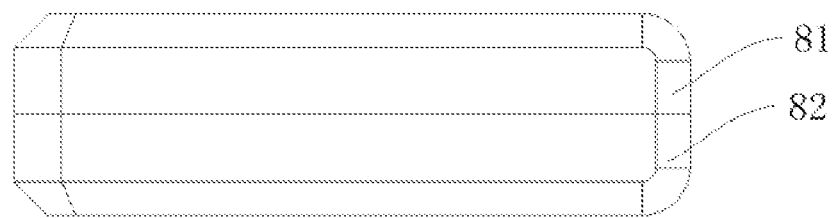
FIG. 5 shows a schematic diagram of a charging device according to an embodiment of the present invention from a third perspective.

FIG. 3 shows a schematic diagram of a charging device according to an embodiment of the present invention from a first perspective; FIG. 4 shows a schematic diagram of a charging device according to an embodiment of the present invention from a second perspective; and FIG. 5 shows a schematic diagram of a charging device according to an embodiment of the present invention from a third perspective. Referring to FIGS. 3, 4, and 5, the charging device further comprises: an illumination lamp 70 provided on the charging device body 10 and connected to the power supply 11. In this embodiment, the illumination lamp 70 is a light-transmitting plate for illumination. In other embodiments, the illumination lamp 70 may also be other illumination equipments. The power supply 11 provides the voltage required by the operating of the illumination lamp 70.

Furthermore, the charging device further comprises: a housing 80 provided around the charging device body 10. Wherein, the housing 80 comprises: a first housing 81, a second housing 82, and a third housing 83. The first housing 81 is disposed opposite to the second housing 82, the first housing 81 is connected to the second housing 82, the first housing 81 and the second housing 82 form a cavity to enable the charging device body 10 to be provided inside the cavity. One side of the third housing 80 is connected to one side of the first housing 81, and the other side of the third housing 83 is connected to one side of the second housing 82. The shape and size of the first housing 81 match those of the second housing 82. The first housing 81 is provided on a first surface of the charging device body 10, the second housing 82 is provided on a second surface of the charging device body 10, and the third housing 83 is provided on a side wall of the charging device body 10.

In this embodiment, the first housing 81 is substantially a rectangular cover structure. The cover structure has four side walls providing end-to-end connection and extending in one direction. One of the side walls of the first housing 81 is formed with a first opening, and the other side wall, adjacent to the side wall which is formed with the first opening, is formed with a second opening. Both the first opening and the second opening are substantially elongated strips. The first opening is configured to accommodate the third housing 83, and the second opening is configured to install the illumination lamp 70. In addition, the switching circuit 50 is disposed at one end of the first housing 81, on one side away from the first opening and the second opening.

The second housing 82 is also substantially a rectangular cover structure. The cover structure has four side walls providing end-to-end connection and extending in one direction. One of the side walls of the second housing 82 is formed with a third opening, and the other side wall, adjacent to the side wall which is formed with the third opening, is formed with a fourth opening. Both the third opening and the fourth opening are substantially elongated strips. The third opening is disposed opposite to the first opening, the first and third opening form a first installation cavity, and the third housing 83 is accommodated and installed inside the first installation cavity. The fourth opening is disposed opposite to the second opening, the fourth and second opening form a second installation cavity, and the second installation cavity is configured for accommodation and installation of the illumination lamp 70.

The third housing 83 is sized and dimensioned to match the size and dimension of the first installation cavity formed by the first housing 81 and the second housing 82. In this embodiment, the third housing 83 has a substantially rectangular plate structure. A plurality of through holes are formed on the third housing 83, so that the display screen 60, the at least one USB interface, and the charging input interface 30 can be exposed, so as to protect the charging device body from being damaged. In this embodiment, the number of the through holes is four, and the four through holes are spaced apart from each other along the direction of the length of the third housing 83.

Furthermore, the charging device further comprises: an anti-skid mat 90 provided on the housing 80. The anti-skid mat 90 is provided on a side, which is away from the charging device body 10, of the first housing 81. The dimension and size of the anti-skid mat 90 match the installation groove for the anti-skid mat on the first housing 81, so that the charging device body 10 can be prevented from slipping down.

In addition, the present application further provides a charging method, comprising the steps of:

Step S101, wirelessly connecting a charging device and a device to be charged;

Step S102, detecting whether the amount of power of the power supply of the charging device is greater than or equal to a pre-set amount of power; and Step S103, controlling the at least one electromagnetic coil to generate a varying magnetic field when the amount of power of the power supply of the charging device is greater than or equal to the pre-set amount of power, so that an internal coil of the device to be charged generates a varying current to cause the charging device to wirelessly charge the device to be charged.

In conclusion, the present application provides a charging device, comprising: a charging device body 10 and an engine starting interface 20 provided on the charging device body 10, wherein the charging device body 10 comprises: a power supply 11, a control unit 13, and at least one electromagnetic coil 12. The control unit 13 is respectively connected to the power supply 11 and the at least one electromagnetic coil 12, and the control unit 13 is configured to control the at least one electromagnetic coil 12 to generate a varying magnetic field when the amount of power of the power supply 11 is greater than or equal to a pre-set amount of power and the charging device is wirelessly connected to a device to be charged, so that an internal coil of the device to be charged generates a varying current to cause the charging device to wirelessly charge the device to be charged. The charging device further comprises: a charging input interface 30 provided on the charging device body 10 for charging the power supply 11 via the charging input interface 30; and at least one USB charging output interface 40, provided on the charging device body 10, and configured for wired charging. The charging device provided in present application can not only be used for starting a vehicle and providing the working voltage for the start of the engine of the vehicle through a smart slip, but can also be used for wirelessly and charging a device to be charged in a wired manner.

The above descriptions are only the preferred embodiments of the invention, not thus limiting the embodiments and scope of the invention. Those skilled in the art should be able to realize that the schemes obtained from the content of specification and drawings of the invention are within the scope of the invention.

INDUSTRIAL APPLICATION

The charging device provided in present application can not only be used for starting an engine of a vehicle and providing the working voltage for the start of the engine of the vehicle, but can also be used for wirelessly charging a device to be charged.

What is claimed is:

1. A charging device with an engine starting interface, comprising: a charging device body and the engine starting interface provided on the charging device body, wherein the charging device body comprises: a power supply, a control unit, and at least one electromagnetic coil; the control unit is respectively connected to the power supply and the at least one electromagnetic coil; and the control unit is configured to control the at least one electromagnetic coil to generate a varying magnetic field when the amount of power of the power supply is greater than or equal to a pre-set amount of power and the charging device is wirelessly connected to a device to be charged, so that an internal coil of the device to be charged generates a varying current to cause the charging device to wirelessly charge the device to be charged, wherein the charging device body further comprises: a switching circuit, the switching circuit is connected to the control unit.

2. The charging device of claim 1, further comprising: a charging input interface provided on the charging device body for charging the power supply via the charging input interface; and at least one USB charging output interface, provided on the charging device body, and configured for wired charging.

3. The charging device of claim 2, wherein the charging device further comprises: a display screen provided on the charging device body and connected to the control unit.

4. The charging device of claim 3, wherein the display screen is provided on one side of the power supply, and the display screen, the charging input interface, the USB charging output interface are arranged side by side.

5. The charging device of claim 2, wherein the USB charging output interface and the charging input interface are provided on the same side of the power supply, and are arranged side by side.

6. The charging device of claim 1, wherein the control unit comprises: a control circuit and a voltage sampling circuit connected to the control circuit, wherein the voltage sampling circuit is connected to the power supply and is configured to acquire an instant voltage amplitude of the power supply, the control circuit controls the power supply to be in a low power consumption state when the instant voltage amplitude is less than a pre-set voltage amplitude.

7. The charging device of claim 6, wherein the voltage sampling circuit is configured to acquire the instant voltage amplitude of the power supply in real time when the switching circuit is in a closed state.

8. The charging device of claim 6, wherein the control unit further comprises: a temperature sampling circuit connected to the control circuit, the temperature sampling circuit is connected to the power supply and is configured to acquire an instant temperature value of the power supply, and the control circuit controls the power supply to be in a low power consumption state when the instant temperature value is greater than a pre-set temperature value.

9. The charging device of claim 8, wherein the temperature sampling circuit is configured to sample the instant temperature value of the power supply in real time when the switching circuit is in a closed state.

10. The charging device of claim 6, wherein the control unit further comprises: a current sampling circuit connected to the control circuit, the current sampling circuit is configured to acquire an instant charging current value of the device to be charged, and the control circuit controls the power supply to be in a low power consumption state when the instant charging current value is less than a pre-set current value.

11. The charging device of claim 10, wherein the current sampling circuit is configured to acquire the instant charging current value of the charging device in real time when the switching circuit is in a closed state.

12. The charging device of claim 1, wherein the charging device further comprises: an illumination lamp provided on the charging device body and connected to the power supply.

13. The charging device of claim 1, wherein the charging device further comprises: a housing provided around the charging device body.

14. The charging device of claim 13, wherein the housing comprises: a first housing, a second housing, and a third housing, the first housing is disposed opposite to the second housing, the first housing is connected to the second housing, the first housing and the second housing form a cavity to enable the charging device body to be provided inside the cavity.

15. The charging device of claim 14, wherein a side wall of the first housing is formed with a first opening, a side wall of the second housing is formed with a third opening, the third opening is disposed opposite to the first opening, the first and third opening form a first installation cavity, and the third housing is accommodated and installed inside the first installation cavity.

16. The charging device of claim 15, wherein a side wall of the first housing is formed with a second opening, a side wall of the second housing is formed with a fourth opening, the fourth opening is disposed opposite to the second opening, the fourth and second opening form a second installation cavity, and the second installation cavity is configured for accommodation and installation of a first illumination lamp.

17. The charging device of claim 13, wherein the charging device further comprises: an anti-skid mat provided on the housing.

18. A charging device with a charging input interface, comprising: a charging device body and the charging input interface provided on the charging device body, wherein the charging device body comprises: a power supply, a control unit, and at least one electromagnetic coil, the control unit is respectively connected to the power supply and the at least one electromagnetic coil; the charging input interface is connected to the power supply for charging the power supply;

and the control unit is configured to control the at least one electromagnetic coil to generate a varying magnetic field when the charging device is spaced apart from a device to be charged, so that an internal coil of the device to be charged generates a varying current to cause the charging device to wirelessly charge the device to be charged;

wherein the charging device body further comprises: a switching circuit, the switching circuit is connected to the control unit.

19. A charging method, applied for the charging device as claimed in claim 1 or 18, comprising:

wirelessly connecting the charging device and a device to be charged;

detecting whether the amount of power of the power supply of the charging device is greater than or equal to a pre-set amount of power;

controlling at least one electromagnetic coil to generate a varying magnetic field when the amount of power of the power supply of the charging device is greater than or equal to the pre-set amount of power, so that an internal coil of the device to be charged generates a varying current to cause the charging device to wirelessly charge the device to be charged.

* * * * *